Patented Dec. 21, 1937

2,102,918

UNITED STATES PATENT OFFICE 2,102,918

ART OF COMBINING RESORCINOL WITH IODINE

George Romanelli, Des Moines, Iowa

No Drawing. Application February 9, 1937, Serial No. 124,927

7 Claims. (Cl. 260—154)

The purpose of my invention is to provide an art or process or method for combining resorcinol with iodine. The process consists in the steps as herein set forth.

Heretofore so far as I am aware there has been no known process for combining resorcinol with iodine.

According to my process, resorcinol is dissolved in a combustible solvent. To the solution is added resublimed iodine which is also thoroughly dissolved.

As an example, two parts by weight (2 grams) of resorcinol may be dissolved in two parts by volume (two milliliters) of ether, and after the resorcinol is thoroughly dissolved, one part by weight (1 gram) of resublimed iodine is added and thoroughly dissolved.

The solution thus made is preferably spread into a relatively thin coating, as over a glass surface, and ignited.

The burning leaves an amorphous black shiny mass. This mass is then broken up with a nonmetallic implement such as a spatula and further evaporation is allowed by exposure to air. After a certain time the broken amorphous mass changes from a black to a deep orange color. The product then resulting is thoroughly triturated and then dissolved in distilled water to a saturated solution. Next it is filtered, preferably through cotton.

The resulting liquid is then spread out thin, as over a glass surface, and exposed to evaporation, whereby there is left an amorphous crystalline mass of beautiful light orange color, which upon further exposure to light and air, turns darker. This is the resultant new product.

This product is stable in all temperatures and is non-hygroscopic.

One of the outstanding features of the product is that it is freely soluble in water. This makes it readily usable, for example, in medicine for various purposes, both local and internal.

It is virtually non-toxic. It has a sweetish, not disagreeable, taste.

It is non-irritating to the mucous membrane when applied in solution.

It has distinct antiseptic and germicidal properties.

It is compatible with many other substances, for instance, in solution, with camphor.

It can be used as a dye.

I make no attempt here to set forth in detail the qualities, characteristics or possible uses of the product which I may say can be used, by itself and in combination with other products, for a great variety of purposes, in medical and other fields.

Some changes may be made in the details of the steps of the process of producing my new product, and it is my purpose to cover by my claims the process defined with any modifications which may be reasonably within the scope of my invention and claims.

I claim as my invention:

1. The art of combining resorcinol with iodine which consists in dissolving resorcinol in an inert combustible solvent, then adding iodine to the solution, then spreading the solution out thin and igniting it, then breaking up the resulting mass and allowing further evaporation.

2. The art of combining resorcinol with iodine which consists in dissolving resorcinol in an inert combustible solvent, then adding iodine to the solution, then spreading the solution out thin and igniting it, then breaking up the resulting mass and allowing further evaporation, then dissolving the mass in water, filtering it and evaporating to a crystalline mass.

3. The art of combining resorcinol with iodine which consists in dissolving resorcinol in ether, then adding iodine to the solution, then spreading the solution out thin and igniting it, then breaking up the resulting mass and allowing further evaporation, then dissolving the mass in water, filtering it and evaporating to a crystalline mass.

4. The art of combining resorcinol with iodine which consists in dissolving resorcinol in an inert combustible solvent in the relative proportion of approximately two grams of resorcinol to approximately two milliliters of solvent, then adding iodine to the solution in the proportion of approximately one gram of iodine, then spreading the solution out thin and igniting it, then breaking up the resulting mass and allowing further evaporation, then dissolving the mass in water, filtering it and evaporating to a crystalline mass.

5. The art of combining resorcinol with iodine, which consists in dissolving resorcinol in an inert combustible solvent in the approximate relative proportions of one gram of resorcinol to one milliliter of solvent, then adding iodine to the solution in the proportion of approximately one half gram of iodine, then spreading the solution out thin and igniting, then after cooling breaking up the resulting mass and allowing further evaporation, then dissolving the mass in water, filtering it and evaporating to a crystalline mass.

6. The art of combining resorcinol with iodine which consists in dissolving resorcinol in an inert combustible solvent in the approximate relative proportions of one gram of resorcinol to one milliliter of the solvent, then adding approximately one half gram of iodine to the solution, then spreading the resulting liquid thinly over a suitable surface and igniting it, then allowing it to cool, breaking it up with a non-metallic implement, and allowing further evaporation by exposure to air until the mass turns to a deep orange color and thereupon dissolving the mass in distilled water to a substantially saturated solution, then evaporating the resultant solution to an amorphous crystalline mass.

7. The art of combining resorcinol with iodine which consists in dissolving resorcinol in an inert combustible solvent, in the approximate relative proportions of two grams of resorcinol and two milliliters of solvent, then adding approximately one gram of iodine to the solution, then spreading the resultant solution out thinly, burning it, then breaking it up and triturating it, allowing further evaporation by exposure to air, then dissolving the product in water, then evaporating the moisture.

GEORGE ROMANELLI.